（12）United States Patent
Huddleston et al.

(10) Patent No.: US 9,660,279 B2
(45) Date of Patent: May 23, 2017

(54) FUEL UNIT FOR HYDROGEN GENERATOR

(71) Applicant: Intelligent Energy Inc., San Jose, CA (US)

(72) Inventors: Craig Huddleston, Lakewood, OH (US); Thomas Kmetich, Willoughby Hills, OH (US); Richard Langan, Parma, OH (US); Chad Law, Milan, CA (US); Michael Stallard, Columbia Station, OH (US); Jason Stimits, Avon, OH (US); Mark Vandayburg, Westlake, OH (US)

(73) Assignee: Intelligent Energy Inc., San Jose, CA (US)

( * ) Notice: Subject to any disclaimer, the term of this patent is extended or adjusted under 35 U.S.C. 154(b) by 298 days.

(21) Appl. No.: 14/478,474

(22) Filed: Sep. 5, 2014

(65) Prior Publication Data

US 2014/0377677 A1    Dec. 25, 2014

Related U.S. Application Data

(63) Continuation of application No. PCT/US2013/028988, filed on Mar. 5, 2013.
(Continued)

(51) Int. Cl.
*H01M 8/04* (2016.01)
*B01J 7/00* (2006.01)
(Continued)

(52) U.S. Cl.
CPC ........... *H01M 8/04208* (2013.01); *B01J 7/00* (2013.01); *C01B 3/065* (2013.01); *H01M 8/04201* (2013.01); *H01M 8/065* (2013.01);

*B01J 2219/1921* (2013.01); *B01J 2219/1923* (2013.01); *B01J 2219/1928* (2013.01);
(Continued)

(58) Field of Classification Search
CPC ........................ H01M 8/065; H01M 8/04208
See application file for complete search history.

(56) References Cited

U.S. PATENT DOCUMENTS

| 3,726,649 | A  | 4/1973 | Pelham |
| 6,294,276 | B1 | 9/2001 | Ogino |

(Continued)

FOREIGN PATENT DOCUMENTS

| CN | 101647145 A   | 2/2010 |
| JP | 2004-519400 A | 7/2004 |
| JP | 2005-203188 A | 7/2005 |
| JP | 2007-091513 A | 4/2007 |
| JP | 2007-509463 A | 4/2007 |
| JP | 2009-184840 A | 8/2009 |
| JP | 2009-227512 A | 10/2009 |
| WO | WO 02/18267 A1 | 3/2002 |
| WO | 2009149459    | 12/2009 |

*Primary Examiner* — Nicholas A Smith
(74) *Attorney, Agent, or Firm* — Baker & Hostetler LLP

(57) ABSTRACT

Disclosed are a fuel unit for a hydrogen generator and methods for producing the fuel unit and the hydrogen generator. A fuel sheet (50) is made by disposing a plurality of fuel pellets (50A-50J) containing a hydrogen-containing material on a substrate (52), and one or more fuel sheets are formed into a non-cylindrical fuel sheet assembly my moving (e.g., bending) a portion of the fuel sheet (50) to position pellets adjacent to each other such that adjacent sides of the adjacent pellets lie in essentially parallel planes. A non-cylindrical fuel unit is produced from one or more of the fuel sheet assemblies. Fuel units can be replaceably disposed in a hydrogen generator, and fuel pellets can be selectively heated to produce hydrogen gas as needed.

17 Claims, 4 Drawing Sheets

Related U.S. Application Data

(60) Provisional application No. 61/607,869, filed on Mar. 7, 2012.

(51) Int. Cl.
*H01M 8/04082* (2016.01)
*C01B 3/06* (2006.01)
*H01M 8/065* (2016.01)

(52) U.S. Cl.
CPC .......... *H01M 2250/30* (2013.01); *Y02B 90/18* (2013.01); *Y02E 60/362* (2013.01); *Y02E 60/364* (2013.01)

(56) References Cited

U.S. PATENT DOCUMENTS

| | | |
|---|---|---|
| 2005/0074643 A1 | 4/2005 | Adams et al. |
| 2005/0142401 A1 | 6/2005 | Ratner et al. |
| 2007/0081939 A1 | 4/2007 | Berry et al. |
| 2007/0224469 A1 | 9/2007 | Isozaki et al. |
| 2008/0032167 A1 | 2/2008 | Matsuoka et al. |
| 2013/0108940 A1* | 5/2013 | Langan ................ C01B 3/0084 429/426 |

\* cited by examiner

FUEL UNIT FOR HYDROGEN GENERATOR

CROSS-REFERENCE TO RELATED APPLICATIONS

This application is a National Stage of International patent application PCT/US/2013/028988, filed on Mar. 5, 2013, which claims priority to U.S. provisional patent application 61/607,869, filed on Mar. 7, 2012, the disclosures of which are incorporated by reference in their entirety.

TECHNICAL FIELD

This invention relates a fuel unit for a hydrogen generator, and to a method of producing the fuel unit and using it in the hydrogen generator to provide hydrogen gas.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (e.g., a fuel cell stack), and a fuel source, such as a fuel tank or a hydrogen generator. Hydrogen generators that supply hydrogen gas to a fuel cell can be an integral part of a fuel cell system, or they can be removably coupled to the fuel cell system. A removable hydrogen generator can be replaced with another one when the hydrogen producing reactants have been consumed. Removable hydrogen generators can be disposable (intended for only a one-time use). Both removable and permanently installed hydrogen generators can be refillable (intended for use multiple times) to replace consumed reactant materials.

Hydrogen generators can produce hydrogen using a variety of starting materials and a variety of methods for initiating the release of hydrogen gas. Hydrogen gas can be evolved when a hydrogen containing material reacts. Examples of hydrogen-containing materials include liquid or gaseous hydrocarbons (such as methanol), hydrides (such as metal hydrides and chemical hydrides), alkali metal silicides, metal/silica gels, water, alcohols, dilute acids and organic fuels (such as N-ethylcarbazone and perhydrofluorene). A hydrogen containing compound can react with another reactant to produce hydrogen gas, when the reactants are mixed together, in the presence of a catalyst, heat or an acid, or a combination thereof. A hydrogen-containing material can be heated to release hydrogen gas, such as in a thermochemical decomposition reaction.

In selecting reactants for use in a hydrogen generator, consideration may be given to the following: (a) stability during long periods of time when the hydrogen generator is not in use, (b) ease of initiation of a hydrogen generating reaction or other hydrogen release, (c) the amount of energy that must be provided to sustain the release of hydrogen gas, (d) the maximum operating temperature required, and (e) the total volume of hydrogen that can be produced per unit of volume and per unit of mass of the hydrogen-containing material(s).

In order to provide hydrogen over a long period of time without developing a very high pressure within the hydrogen generator, it is desirable to generate the hydrogen on an as-needed basis. This can be accomplished by controlling the release of hydrogen gas from the hydrogen-containing material(s), such as by reacting only a limited quantity at a time. While this can be achieved by segregating the hydrogen-containing material into small quantities, it can add cost and complexity to the manufacturing process, and can require such things as thermal insulation of adjacent quantities of the material as well as more complicated controls.

An object of the present invention is to provide a hydrogen generator with one or more of the following features: capable of producing a large total volume of hydrogen gas per unit of mass and per unit of volume of the hydrogen generator, capable of controlling the release of hydrogen to provide hydrogen on an as needed basis without producing an excessive internal pressure, capable of operating at or below a desired maximum temperature, capable of replacing spent materials with fresh materials, long term durability and reliability, and capable of being manufactured easily and economically.

SUMMARY

The above objects and other advantages are accomplished by the present invention, in which at least a portion of a process for producing fuel units can be performed using a high speed manufacturing process, and the resultant fuel unit and hydrogen generator in which it is used are highly volume efficient.

Accordingly, in one aspect of the invention there is provided a method of producing and a fuel unit for a hydrogen generator, the method including the steps: a. providing a substrate in the form of a sheet; b. providing a fuel comprising a hydrogen-containing material that releases hydrogen gas when heated; c. disposing a plurality of pellets of the fuel on the substrate to form one or more fuel sheets, wherein each pellet has one or more sides, with interstices disposed between adjacent pellets; d. forming a non-cylindrical fuel sheet assembly from the one or more of the fuel sheets by moving at least one of the first and second fuel sheet portions to position pellets adjacent to each other such that adjacent sides of the adjacent pellets lie in essentially parallel planes; and e. producing a non-cylindrical fuel unit from one or more of the fuel sheet assemblies. Embodiments can include one or more of the following features:

moving the first and second fuel sheet portions includes disposing the first and second fuel sheet portions so pellets on the first fuel sheet portion face pellets on the second sheet portion; at least one pellet on the first fuel sheet portion can be positioned in the interstice between two adjacent pellets on the second fuel sheet portion;

moving the first and second fuel sheet portions includes bending the substrate to form an angled or curved segment between two adjacent pellets;

the substrate is provided from a roll or a folded stack;

the pellets are disposed on the substrate sheet by one or a combination of casting, extruding, compressing, molding, spraying, depositing, coating, roll coating, printing and laminating;

the step of forming a fuel sheet includes rolling the fuel sheet into a roll, and the step of forming a fuel sheet assembly comprises feeding the fuel sheet from the roll;

prior to assembly, adjacent sides of the adjacent pellets are parallel when the substrate is disposed in a plane; the pellets can have a rectangular cross section normal to the planes of the adjacent sides; the pellets can have a square cross section normal to the planes of the adjacent sides; the fuel sheet assembly can include a stack of pellets;

prior to assembly, adjacent sides of the adjacent pellets are not parallel when the substrate is disposed in a plane; the pellets can have a trapezoidal cross section normal to the planes of the adjacent sides; the pellets can have a triangular cross section normal to the planes of the adjacent sides;

the fuel unit is a prismatic fuel unit;

the method further includes forming a package around the fuel sheet assembly; the package can include a material that has a poor thermal conductivity and a poor electrical conductivity; the package can include sections of a material that has a good thermal conductivity and a good electrical conductivity;

the one or more fuel sheets are assembled with thermal insulation disposed between adjacent pellets;

one or more of the pellets are disposed on each of opposite surfaces of the substrate sheet; and the fuel units are portable.

In a second aspect of the invention there is provided a method of producing hydrogen gas, the method including the steps: a. providing a substrate in the form of a sheet; b. providing a fuel comprising a hydrogen-containing material that releases hydrogen gas when heated; c. forming a fuel sheet by disposing a plurality of pellets of the fuel on the substrate, each pellet having one or more sides, with interstices disposed between adjacent pellets; d. forming a non-cylindrical fuel sheet assembly from one or more of the fuel sheets by moving at least one of the first and second fuel sheet portions to position pellets adjacent to each other such that adjacent sides of the adjacent pellets lie in essentially parallel planes; e. producing a non-cylindrical fuel unit from one or more of the fuel sheet assemblies; f. disposing the fuel unit in a hydrogen generator; and g. selectively heating pellets to release hydrogen gas from the fuel therein.

the heating is done by a plurality of heaters; each of the plurality of heaters can be disposed in the fuel unit, and each heater can be disposed to heat at least one of the pellets; the method further can further include disposing the heaters between adjacent surfaces of adjacent pellets; each of the plurality of heaters can be disposed in the hydrogen generator;

the method further comprises disposing thermal conductors between adjacent surfaces of adjacent pellets to conduct heat from the heaters to the pellets; and the method further comprises removing a spent fuel unit from the hydrogen generator and disposing a fresh fuel unit in the hydrogen generator.

In a third aspect of the invention there is provided a fuel unit for a hydrogen generator, the fuel unit made by a method comprising the steps: a. providing a substrate in the form of a sheet; b. providing a fuel including a hydrogen-containing material that releases hydrogen gas when heated; c. forming a fuel sheet by disposing a plurality of pellets of the fuel on the substrate, each pellet having one or more sides, with interstices disposed between adjacent pellets; and d. forming a non-cylindrical fuel sheet assembly from one or more of the fuel sheets by moving first and second fuel sheet portions to position adjacent pellets such that adjacent sides of the adjacent pellets lie in essentially parallel planes; and producing a non-cylindrical fuel unit from one or more of the fuel sheet assemblies.

In another aspect of the invention, there is provided a fuel cell system including a fuel cell battery and a hydrogen generator as described above. In an embodiment the fuel cell system is portable.

DETAILED DESCRIPTION

Figure 1A:
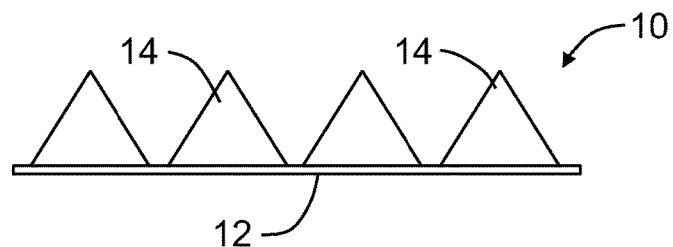
FIG. 1A is a plan view of a first embodiment of a fuel sheet.

The above objects are accomplished by the present invention. A fuel unit according to the invention can be use in a hydrogen generator, which can be part of a hydrogen consuming system, such as a fuel cell system. The hydrogen generator is a hydrogen gas generating apparatus that produces hydrogen gas. The hydrogen gas can be consumed by a fuel cell battery to produce electricity for an electronic device. Preferably the hydrogen generator is portable, either alone or as part of a fuel cell system. As used herein, portable means readily moved by an individual person, without requiring the use of lifting or transporting equipment (e.g., a hoist, dolly, lift truck or the like).

The fuel unit contains one or more hydrogen-containing materials (referred to below as fuel) that will release hydrogen gas when heated to a sufficient temperature. In order to economically produce a large volume of hydrogen gas per unit of volume and weight, it is advantageous to use a reactant that can undergo a thermal decomposition reaction that produces hydrogen gas when heated. Such thermal decomposition reactions can produce a larger volume of gas of reactant than, for example, the same amount (per mole, per unit of weight or per unit of volume) of reactants that undergo a hydrolysis reaction. Preferred fuels do not require costly catalysts to undergo the desired hydrogen-generating reactions.

In order to provide an economical hydrogen generator, it is desirable to be able to replace used fuel units with fresh fuel units, rather than replacing the entire hydrogen generator. This allows durable components of the hydrogen generator to be used many times. To maximize this effect, it is desirable to incorporate as many reusable components as practical into the reusable portion of the hydrogen generator (referred to below as the holder) or the rest of the system and to limit the number of components in the fuel unit to the extent that is practical. This is particularly true for such items that occupy a relatively large volume and/or are relatively expensive. Ideally, fuel units would contain only the hydrogen generating reactants and minimal packaging. However, for practical reasons it may be desirable to include other ingredients and components in the fuel units.

The hydrogen generator includes a holder that is configured to receive one or more fuel units and contains at least some of the other components of the hydrogen generator. In some circumstances, it may be desirable to locate at least some portions of those other components outside the holder, such as elsewhere within the hydrogen consuming system. The holder can include a housing of its own, particularly if the holder is intended to be removed from or used while outside the rest of the system. A separate holder housing may not be desired if the hydrogen generator is permanently contained within the system. For example, a portion of the system can serve as all or part of a holder housing. The holder housing has sufficient mechanical strength and resistance to the environment to which the hydrogen generator is expected to be exposed, particularly to high temperatures and fuels and their byproducts. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethylenglycol anhydride (Bakelite®), epoxies, phenolics, diallyl phthalate and melamine may be suitable for the housing. In some embodiments the holder may be made from a material that is a poor thermal conductor (e.g., less than 10 watts/meter•Kelvin), and preferably less than 1 watt/meter•Kelvin) to protect the rest of the fuel cell system, the device and/or the user from heat produced within the hydrogen generator. If desired, thermal insulation can be added to the hydrogen generator, within the housing, around the housing or elsewhere in the fuel cell system or the device. A vacuum, such as in a hollow space in a wall(s) of the holder, can provide thermal insulation. Thermal insulation can protect components of the hydrogen generator, other parts of the fuel cell system, the device with which the fuel cell system is being used, and/or the user.

The holder includes one or more cavities into which fuel units can be inserted. The cavity can include features for aligning the fuel unit in a particular orientation, providing thermal and/or electrical contact with the fuel unit, and/or providing a hydrogen gas flow path between the holder and the fuel unit. For example, the cavity can include one or more projections that cooperate with features of the fuel unit to permit insertion of a fuel unit into the cavity in only the desired orientation, projections can provide electrical and/or thermal contact with the fuel unit, or one or more projections can extend into a recessed area of the fuel unit to provide heating from the inside of the fuel unit outward. The holder can be closable to retain the fuel unit within the cavity, and it may be sealable to exclude gases from the outside environment and to contain pressurized hydrogen gas. If internal pressure can build up during operation of the hydrogen generator, it may be desirable to include a pressure relief vent in the housing to release gas before the pressure gets too high (i.e., to prevent undesired opening or bursting of the housing).

Hydrogen gas produced in the fuel unit flows through a hydrogen outlet that interfaces with the rest of the system. The hydrogen generator can also include various fittings, valves and electrical connections for providing hydrogen to and interfacing with the system. It may be desirable to provide one or more filters or purification units (referred to as filters below) in the hydrogen flow path to remove solid or gaseous byproducts (such as fuel cell poisons) and/or unreacted reactant from the hydrogen. Filters can be located within the fuel units, within the holder and/or at the interface between the hydrogen generator and the rest of the system. Filters within the fuel units are replaced when the fuel units are replaced. It may be desirable to provide access for periodically replacing filters located outside the fuel units. Examples of materials that may be suitable for filters include silica, silicon dioxide, silicon nitrides, silicon carbide, silica aerogel, alumina, aluminum oxide, glass, glass wool, mineral wool, cellular glass, perlite and polymers such as polyimides and epoxy-amine composites, as well as suitable gas purification units (such as ion exchange resins). It may be possible to position filters so they also provide thermal insulation.

The hydrogen generator also includes one or more initiators for converting electric energy to thermal energy to heat the fuel. In various embodiments an initiator can include an electric heater, an electrostatic generator or an electromagnetic generator. Examples of suitable energy sources include one or a combination of a primary battery, a secondary battery, a fuel cell battery, a capacitor and a public utility. The energy source is preferable outside the fuel unit, such as in the holder, elsewhere in the, in the device, or external to the device, though the energy source could be included within the fuel unit (e.g., when the energy source is a small battery with low capacity that must be replaced frequently). Circuitry in the holder can carry the electric energy to the initiator. The initiator(s) are preferably located outside the fuel unit (e.g., in the holder), where they can be reused. In some embodiments the initiator(s) can be located within the fuel unit, particularly when the initiators occupy only a small volume and are inexpensive.

A preferred initiation system includes one or more electric heaters, such as resistive heaters. Resistive heaters can include metals or alloys such nickel-chromium, iron-chromium-aluminum, copper-nickel and tungsten. An external heater (outside the fuel unit) is in thermal contact with a thermally conductive portion of the fuel unit such that heat produced by the heater is conducted through any packaging to the contents of the fuel unit. For example, the heater or an intermediate thermal conductor can protrude from a surface of the cavity (e.g., a side wall, an end wall or a removable wall section, such as a door) to contact the fuel unit. To provide good thermal contact, the fuel unit can fit snugly against the heater or intermediate thermal conductor. In an embodiment, the heater or intermediate thermal conductor is biased against the fuel unit. This can be accomplished by configuring the heater as a biasing member and/or by placing an intermediate biasing member that is a good thermal conductor in thermal contact between the heater and the fuel unit for example. The use of a biasing member can provide good thermal contact between the heater and the fuel unit without impeding insertion or removal of the fuel unit from the cavity and can compensate for expansion or contraction of the fuel unit during use. If the heater is internal, it is in electrical communication with the energy source, such as through electrical terminals in the holder that make electrical contact with corresponding electrical contacts in the fuel unit. The terminals can be biased against the fuel unit in a manner similar to that described above for external heaters and intermediate thermal conductors. The electrical contacts can be located in electrically conductive portions of the fuel unit or a fuel unit package, or the electrical contacts can project from the fuel unit to make contact with the terminals.

An electrostatic initiation system uses a potential applied to one or more sets of spaced apart positive and negative terminals to initiate the desired reaction with discrete electrostatic discharge events, with the reactant responding either directly to the applied potential, or indirectly to heat produced by a spark that is produced. Positive and negative terminals in the holder make electrical contact with electrically conductive portions of the fuel unit package on opposite sides of the fuel unit. The electrostatic discharge event is generated between the two electrically conductive portions of the package, which function as electrodes. To provide good electrical contact between the terminals in the holder and the adjacent portions of the fuel unit package, the terminals can be biased against the fuel unit package, such as by configuring the terminals as biasing members. This can provide good electrical contact between the terminals and the fuel unit package without impeding insertion or removal of the fuel unit from the cavity.

An electromagnetic initiation system uses alternating current flowing through one or more primary coils to either induce a rapidly oscillating alternating current in a secondary coil (inductive heating) or induce rapidly oscillating dipole rotation in polar molecules in the material of a secondary member (dielectric heating) in the fuel unit. Collisions among the moving molecules in the secondary coil or member heats the secondary coil or member. If the energy source is a direct current source, an inverter can be used to convert the current to alternating current. A suitable power range for the alternating current can be from about 50 to about 100 watts. In a fuel cell system, the alternating current power is typically a small fraction of the power rating of the fuel cell battery. For example, a suitable drive frequency for the primary coil can be within the range of about 10 to about 75 KHz. The primary coil is a multi-turn coil extending around the entire cavity containing the fuel unit to maximize voltage and reduce the current in the primary coil and minimize heat generation, ohmic losses and semiconductor switching losses in the primary coil. The primary coil can be located on a portion of the holder (e.g., on, recessed below or protruding from a surface thereof) where it can be aligned with the secondary coil or the secondary member in the fuel unit such that it can induce an alternating current or dipole rotation in the secondary coil or member. Alternatively, the primary coil can be located in the fuel unit, such as on an external surface of the package or on or near an internal surface of the package, in electrical contact with the energy source, such as between electrical contacts in or projecting from the package and corresponding terminals in the holder. Materials used for electric motor or transformer coils, such as copper, aluminum, iron and alloys thereof are generally suitable for a primary coil. If wire is used, it can be wound on a non-metallic bobbin. A resin, such as a resin suitable for electric motor or transformer coil impregnation, can be used to bond wraps of the primary coil.

As described in further detail below, multiple initiators can be used to provide the capability of selectively heating limited quantities of the total amount of fuel in one or more fuel units. This can be helpful in generating hydrogen gas on an as needed basis and minimizing response times during intermittent use, without creating excessive pressure within the hydrogen generator. For example, individual initiators can be associated with segregated quantities of the fuel within a fuel unit, and operation of selected initiators can be controlled to initiate reaction within only the desired quantities of reactant. This can require alignment of the fuel units with individual initiators or contact terminals in the holder. As an alternative, an initiator can be moved within the cavity to align with selected portions of the fuel unit. This can provide controlled generation of hydrogen gas with fewer initiators, but adding volume and cost for of the mechanism necessary to move the initiator.

The hydrogen generator includes one or more fuel units that can preferably be inserted into and removed from a corresponding cavity or cavities in the holder. Each fuel unit has one or more segregated quantities of a fuel capable of releasing hydrogen gas when heated to or above a critical temperature. The fuel can be included in a mixture that is preferably a high density solid mixture, rather than a gas, liquid or gel. The fuel and mixture can be in any suitable form, such as powdered, granular or formed into solid bodies such as pellets, pills, tablets, wafers or cakes. As used herein, the term "pellet" is used to refer to a segregated quantity of fuel or fuel mixture, regardless of its composition, form, size or shape. The pellets can be sized and shaped to produce a desired amount of hydrogen gas, fit within the fuel unit in a volume efficient manner, facilitate initiation, prevent cross-initiation of adjacent quantities, facilitate release of generated hydrogen, and so on. Pellets can be segregated from one another in various ways such as by containment in individual compartments and/or being spaced apart by gaps, coatings, thermal insulation and the like.

The pellets contain at least one hydrogen-containing material. More than one hydrogen-containing material can be included. Examples of fuels that can release hydrogen gas when heated are: lithium imide ($Li_2NH$), lithium amide ($LiNH_2$), an ammonium halide (e.g., $NH_4F$, $NH_4Cl$ or $N_2H_6C_{12}$) plus a chemical hydride (e.g., $LiH$, $LiBH_4$, $NaBH_4$, $LiAlH_4$ or $NaAlH_4$), alane ($AlH_3$), ammonia borane ($NH_3BH_3$), ammonia borane plus a chemical hydride (e.g., alane or a boron hydrazine complex such as hydrazine bisborane ($N_2H_4(BH_3)_2$)), ammonium nitrate ($NH_4NO_3$) plus diammonium decaborane ($B_{10}H_{10}(NH_4)_2$), and other materials, such as graphene and carbon nanotubes with hydrogen inserted therein. Choices of fuels may be limited by other factors such as their physical and chemical properties; the type of initiation system being used; the desired operating temperature range, whether the release of hydrogen gas is exothermic or endothermic; the composition, form and properties of reaction byproducts; and so on.

The pellets can also contain one or more additives. Examples of additives include binders (e.g., acrylates and styrene block copolymers), stabilizing compounds (e.g., solid bases), thermally conductive materials (e.g., metals, graphites and combinations and composites thereof), ignition materials as described below, thermally conductive coatings or layers, thermally insulating coatings or layers, and so on. Preferably catalysts are not included in the reactant mixture.

It may be desirable to include an ignition material in the fuel unit, especially if the fuel is endothermic. An ignition material reacts exothermically when heated and can be used in conjunction with the initiation system to provide heat to initiate the release of hydrogen gas from the fuel. An ignition material can provide a number of advantages. The temperature to which the ignition material must be heated to react may be lower than the minimum initiation temperature for the release of hydrogen gas from the fuel, reducing the heat producing requirement for the initiation system. Because the ignition material reacts exothermically, it can reduce the total amount of energy that must be supplied to the initiator during use of the fuel unit, particularly if the hydrogen is released in an endothermic thermal decomposition reaction. An ignition material can be disposed within or in contact with a pellet. For example, the ignition material can be an ingredient of the fuel mixture, the ignition material can be a separate layer of the pellet from a layer containing the fuel, or ignition material can be in a separate pellet in thermal communication with a pellet containing the fuel. When an ignition material is separate from the fuel, either as a separate layer or as a separate pellet, portions containing ignition material can be alternated with portions containing reactant. For example, each portion containing fuel can have an adjacent portion of ignition material; a portion containing ignition material can be disposed adjacent to multiple portions containing fuel. If desired, ignition material can be proximate a surface of the fuel unit to facilitate initiation by an initiator. A portion of ignition material can extend away from the point of initiation to facilitate heating fuel in remote portions of the fuel unit. (In some embodiments, both the portion containing reactant and the portion containing ignition material contain reactant and ignition materials, but in different proportions. In these embodiments, a portion containing a higher proportion of fuel is referred to as a portion containing reactant, and a portion containing a higher proportion of ignition material is referred to as a portion containing ignition material.) Some types of ignition materials will also produce hydrogen gas when they react, contributing to the total amount of hydrogen the fuel unit can provide. Examples of ignition materials include iron powder or $TiH_2$ plus $KClO_4$, $MnO_2$ plus $LiAlH_4$, Ni plus Al, Zr plus $PbCrO_4$, $Fe_2O_3$ plus Al (thermite), and $LiAlH_4$ plus $NH_4Cl$. It will be understood that references herein to initiating a reaction in a hydrogen-generating reactant includes initiating a heat-generating reaction in an ignition material in embodiments in which the fuel unit includes an ignition material.

The fuel unit contains a plurality of pellets, with the pellets disposed on one or more substrate sheets to form one or more fuel sheets. Pellets can have various geometric shapes, such as squares, rectangles, triangles, trapezoids and parallelograms. The fuel sheets can be arranged in various ways within the fuel unit. For example, the fuel sheets can be moved so that pellets are in one or more layers of one or more pellets each. Pellets of fuel or fuel mixture can be formed in various ways, such as by casting, extruding, compressing, molding, spraying, depositing, coating, roll coating, printing, laminating, and so on. The pellets can be formed and then disposed on the substrate, or they can be formed on the substrate. The fuel sheets can be formed into fuel sheet assemblies having a variety of shapes and configurations, as described in further detail below. The substrate on which the pellets are disposed can serve other purposes in the fuel unit. For example, the substrate can be part of fuel unit packaging; provide structural support to provide strength or gas flow paths; provide electrical or thermal conduction or electrical or thermal insulation; etc. The substrate can also provide features that may be necessary or advantageous, such as good electrical or thermal conductivity, poor electrical or thermal conductivity, structural strength, and filtration.

The fuel unit can include a package to contain the fuel as well as at least non-gaseous byproducts. The package will have sufficient strength and chemical and thermal stability to do so during shipping, storage and handling prior to use, during use, and during removal and subsequent handling. Examples of materials that can be used for the package include metal foil, polymer film, laminates such as metal/plastic laminates, and cast or molded casings. Laminates and cast or molded casing can be advantageous when only portions of the package can or must be electrically or thermally conductive or nonconductive. For example, conductive areas can be created in a nonconductive casing by insert-molding metal members, and conductive areas can be created in a metal/plastic laminate by exposing a center metal layer through openings in outer plastic layers. Examples of metal/plastic laminates include metals such as aluminum, nickel, copper and steel and polymers such as polyesters, nylons, polypropylene and polyethylene. High temperature plastics and thermosets can be used to cast or mold casings; examples include polyimides such as KAPTON® (from DuPont) and polyether ether ketone (PEEK) polymers. The package can be closed by any suitable method or methods, such as by folding and/or overlapping, mechanically closing, sealing (e.g., with an adhesive, heat seal, ultrasonics) and so on. The type of initiation system used may require that the package include other properties as well (e.g., electrically or thermally conductive or insulating). It may also be desirable for the package to remain closed or sealed except to release hydrogen as needed. This can require the use of a hydrogen outlet valve and/or the capability of containing at least some internal pressure. Closing or sealing the package can protect the contents from exposure to the environment (e.g., from oxygen and moisture), contain small quantities of hydrogen that may be produced before the fuel unit is used, and facilitate removal of contaminants from the hydrogen gas before it is released from the fuel unit.

It may be desirable to include thermal insulation near or as part of the package to protect the user when a used fuel unit is removed from the hydrogen generator. The package itself may be or include (e.g., as a layer thereof) a poor thermal conductor, or a layer of thermal insulation can be provided external or internal to the package. Examples of materials that may be suitable as thermal insulation include silica, silicon dioxide, silicon nitrides, silicon carbide, silica aerogel, alumina, aluminum oxide, glass, glass wool, mineral wool, cellular glass, perlite, and polymers such as polyimides and epoxy-amine composites. The hydrogen generator can include means for preventing removal of a hot fuel unit from the hydrogen generator. For example, temperature can be monitored with a sensor, and a latching mechanism can be maintained in a latched position to prevent opening a door to remove the fuel unit.

In order to provide hydrogen gas on an as-needed basis without developing a high internal pressure within the hydrogen generator, the fuel unit(s) contain a plurality of pellets in which the release of hydrogen gas can be individually initiated on a selective basis. This can be accomplished by using a control system in conjunction with the initiation system, the initiation system including multiple initiators and/or a moveable initiator that can be located within or aligned with individual fuel units and/or individual pellets or groups of pellets in the fuel unit(s). The initiator(s) can be aligned or alignable with individual pellets or groups of pellets.

A control system can control the supply of energy from a source to the initiation system. The control system can determine the need for hydrogen and/or the required hydrogen flow rate by monitoring the pressure within the fuel cell system, one or more electrical characteristics of a fuel cell stack, or one or more electrical characteristics of an electronic device, for example. The controller may communicate with the device or the fuel cell stack to determine when more hydrogen is needed. The control system can be completely or partially disposed in the hydrogen generator or the system (e.g., the fuel cell stack or the electronic device being powered by the fuel cell stack), or any combination thereof. The control system can include a microprocessor or micro controller; digital, analog and/or hybrid circuitry; solid state and/or electromechanical switching devices; capacitors, sensing instrumentation, timers and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

Each type of initiation system has certain features and requirements as well as advantages and disadvantages. The type of initiation system selected can be based on considerations such as size, complexity, ease of manufacture, material requirements for the initiation system and other components of the fuel cell system, the type of reactant desired and others, as described in further detail above and below.

An external electric heater initiation system as described above requires a fuel unit with a package having at a least a portion that has good thermal conductivity (e.g., aluminum, copper and stainless steel) in order for heat from the heater(s) to be conducted into the fuel unit with minimal heat loss. An internal electric heater initiation system requires good electrical contact, e.g., directly with the fuel/fuel mixture, through a portion of the package, or through electrical contacts extending through the package. It may be desirable to limit each thermally conductive portion such that it is in thermal communication with only one or several selected pellet(s) in order to prevent heat from one heater from initiating more than the selected pellet(s). It may be desirable to include thermal conductors within the fuel unit to provide good heat transfer to remote portions of the pellet (portions that are not close to the package or the heaters). Such an internal thermal conductor can be in direct contact with an internal (remote) surface of the desired pellet, or it can be at least partially embedded within the pellet. A thermal conductor with a relative large surface in contact with the pellet (e.g., a flat plate rather than a thin wire) may be desirable. Although other types of materials (e.g., heat pipes, molded thermoset materials loaded with metal dust, and graphite) may be suitable, metals such as copper, aluminum, silver and stainless steel can be advantageous with regard to thermal conductivity, thermal stability, chemical stability and mechanical strength. The greater the thermal conductivity of the pellet, the more efficient an electric heater initiation system can be. The thermal conductivity will depend on the thermal conductivity of the reactant mixture, including both the reactant and any additives. Thermal conductivity within the pellet can be enhanced in various ways, such as by including thermally conductive additives such as metal dust or fibers in the reactant mixture and by using a reactant (e.g., alane ($AlH_3$)) that has a reaction product (e.g., aluminum metal) with good thermal conductivity. When the fuel unit includes internal heaters, heating efficiency can be enhanced by locating the heaters away from the outer surface of the fuel unit.

The fuel unit according to the present invention is well suited to high speed manufacturing, which is desirable to minimize manufacturing costs. Large sheets or sheets in strip form can be fed, preferably automatically, a large number of pellets can be disposed on the sheet(s) in a short period of time using any of a variety of processes, and the resultant fuel sheet(s) can be further processed to form fuel sheet assemblies and fuel units. The fuel sheets can be fed directly to a subsequent manufacturing operation, or they can be collected (e.g., in sheet or rolled form) for subsequent use.

For many applications fuel units and hydrogen generators with generally prismatic rather than round or cylindrical shapes are advantageous, e.g., to be more volume efficient. The present invention is also well-suited for manufacturing fuel units with generally prismatic shapes, with substantially flat surfaces (though edges, corners and the like can be rounded, and connectors and the like may protrude from the fuel unit, for example).

Substrate sheets are supplied, e.g., in individual sheet form or from a roll or coil of material. Selection of a substrate material is based on desired properties, such as its heat resistance, chemical resistance, flexibility, thermal conductivity, electrical conductivity and the like. Pellets can be preformed, fed and applied to the substrate sheet (e.g., adhered by compression or with an adhesive), or the pellets can be formed directly on the substrate (e.g., by a suitable coating, laminating or printing process), thereby forming a fuel sheet. The pellets can be disposed in various types of arrays, such as, but not limited to, a single row or a plurality of rows. Each pellet has at least one essentially planar side. The planar side can be a side extending from the substrate or another side, such as a side essentially parallel to the substrate, with interstices (i.e., spaces or gaps) between adjacent pellets. Optionally, the pellets or portions thereof can be covered or coated, such as with thermal insulation, thermal insulation or ignition material. The fuel sheet can then be fed directly to a fuel sheet assembly process, or the fuel sheet can be cut into strips or smaller fuel sheets that are subsequently provided to the fuel sheet assembly process.

One or more of the fuel sheets can be formed into a fuel sheet assembly, by moving fuel sheet portions to position pellets adjacent to each other such that adjacent sides of adjacent pellets lie in essentially the same plane. This can be done by combining separate fuel sheets, by bending the substrate to form an angle or radius between adjacent pellets.

Moving the sheet repositions pellets so adjacent essentially planar sides of adjacent pellets are in essentially parallel planes. In one embodiment the adjacent pellets are on separate substrate sheets, and moving one fuel sheet relative to the other positions one or more pellets on one substrate portion against or in the interstices between the pellets on the other substrate portion. In another embodiment, the adjacent pellets are on portions of a single substrate sheet, and the pellets are repositioned by bending the substrate. Because the adjacent sides in the resultant fuel sheet assembly are in essentially parallel planes, little or no space is wasted at the interface between adjacent pellets, and the volume efficiency of the fuel unit can be maximized. In yet another embodiment, the fuel sheet assembly includes separate fuel sheets, at least one of which is bent to reposition the pellets.

One or more other materials and/or components can be disposed at the interface between adjacent pellet surfaces. Preferably these other materials and/or components will have uniform thicknesses at the interface, to minimize wasted space. This is also well-suited to high speed manufacturing processes, since these materials and components can be fed in strip or individual sheet form, or they can be applied using a coating process, for example.

In one embodiment, electrical and/or thermal insulation can be provided between pellets. This can prevent initiation of the release of hydrogen gas in one pellet from resulting in an unintended initiation of a release of hydrogen gas in an adjacent pellet, e.g., due to electrical or thermal energy applied to or heat produced within one pellet from being conducted to an adjacent pellet.

In another embodiment, an electrically or thermally conductive material can be disposed between pellets. This is particularly advantageous when the fuel or fuel mixture is a poor electrical or thermal conductor. The conductive material can provide more efficient conduction of electrical or thermal energy to portions of the pellets that are farther away from the initiator, especially when the initiators are not within the fuel unit. The conductive material can also contribute to more efficient heating of the fuel by providing heating from the inside of the fuel unit.

In yet another embodiment, parts of the initiation system, such as heating elements, can be disposed between pellets, providing more efficient heating than if those components were disposed only on or adjacent to external surfaces of the pellets.

Various embodiments of fuel sheets are illustrated in FIGS. 1A, 2A, 3A, 4A and 5A, and embodiments of fuel sheet assemblies that can be formed therefrom are illustrated in FIGS. 1B, 2B, 3B and 4B, respectively. In each of these embodiments, the numbers, sizes, shapes and spacing of the pellets can be varied, as can the configurations of the fuel sheets in the fuel sheet assemblies. The pellets are shown with all sides being essentially planar and all adjacent sides being in essentially parallel planes. However, it will be understood that, while it is preferable for all adjacent sides to be planar and in parallel planes, those sides that are not repositioned to be adjacent to corresponding sides of adjacent pellets are not necessarily planar or in parallel planes. Spaces are shown between adjacent sides of adjacent pellets in the fuel sheet assemblies, but spaces are not necessarily required. Optional fuel unit components, such as insulators, conductors and heating initiators can be disposed within those spaces, as disclosed above and illustrated in FIGS. 6 and 7 for example.

Figure 1B:
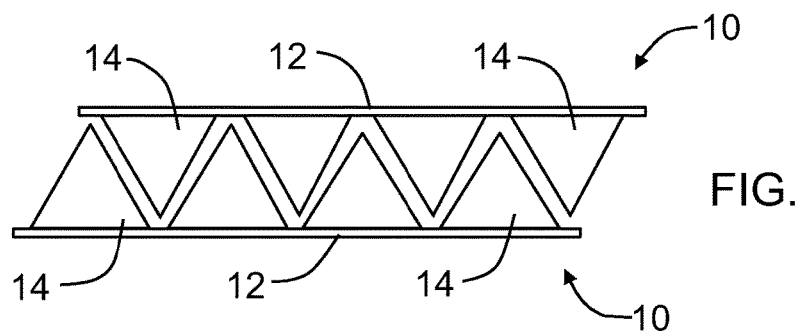
FIG. 1B is a plan view of two fuel sheets as shown in FIG. 1A, formed into a fuel sheet assembly.

FIG. 1A, shows a fuel sheet 10 with a plurality of pellets 14 having sides and disposed on a substrate sheet 12. Separate fuel sheets 10 can be combined in a fuel sheet assembly, as shown in FIG. 1B, e.g., by placing the fuel sheets 10 with the pellets 14 facing each other. The pellets 14 can be positioned such that pellets 14 on one of the fuel sheets 10 are disposed in the interstices between the pellets 14 on the other fuel sheet 10. Adjacent pellets have adjacent sides that are essentially planar, and the adjacent sides lie in essentially parallel planes, so that gaps between adjacent sides are uniform. The pellets 14 are shown as having triangular cross sections, but the cross sections can have other shapes, such as squares, rectangles, trapezoids, parallelograms, etc.

Figure 2A:
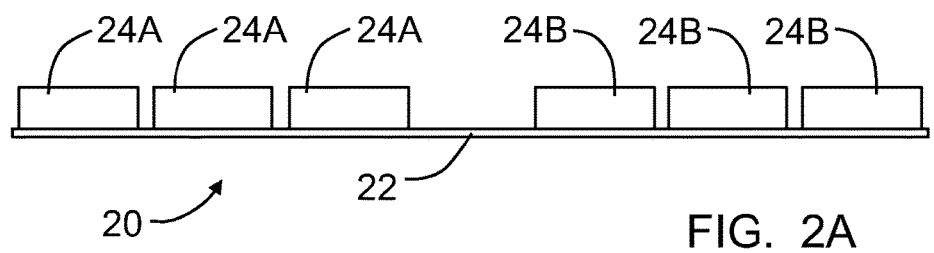
FIG. 2A is a plan view of a second embodiment of a fuel sheet.
Figure 2B:
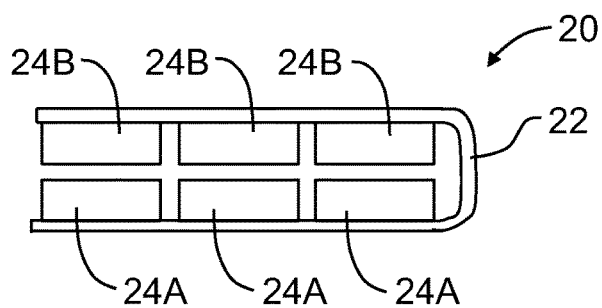
FIG. 2B is a plan view of the fuel sheet in FIG. 2A, formed into a fuel sheet assembly.

In another embodiment, the fuel sheet assembly can be formed from a single fuel sheet. Such an embodiment is illustrated in FIGS. 2A and 2B. Here pellets 24A and 24B are disposed on a single substrate 22. The pellets 24A and 24B have planar top surfaces, as oriented in FIG. 2A, and in FIG. 2B the substrate 22 is bent such that pellets 24B are inverted relative to FIG. 2A so their previously top planar surfaces are adjacent to the top planar surfaces of pellets 24A, and the adjacent surfaces of pellets 24B are in a plane essentially parallel to the plane of pellets 24A. In variations of the embodiment shown in FIGS. 2A and 2B, pellets 24A and 24B have parallel adjacent sides as oriented in FIG. 2A. The pellets 24A and 24B can be spaced apart sufficiently for pellets 24B to be disposed in interstices between pellets 24A when the fuel sheet 20 is folded to form the fuel sheet assembly. In other variations, the pellets can have other cross-sectional shapes besides the rectangular shapes shown in FIGS. 2A and 2B.

Figure 3A:
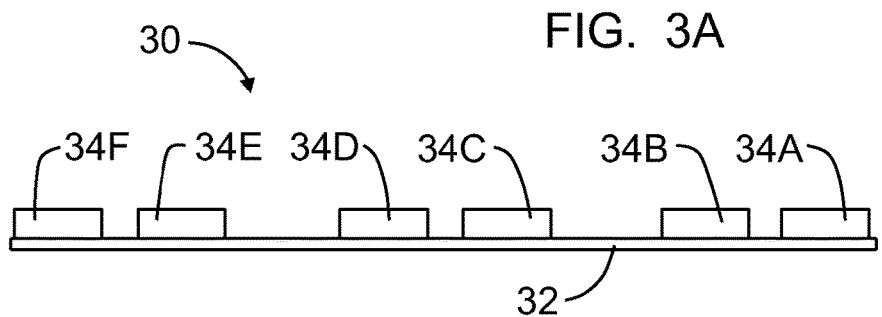
FIG. 3A is a plan view of a third embodiment of a fuel sheet.
Figure 3B:
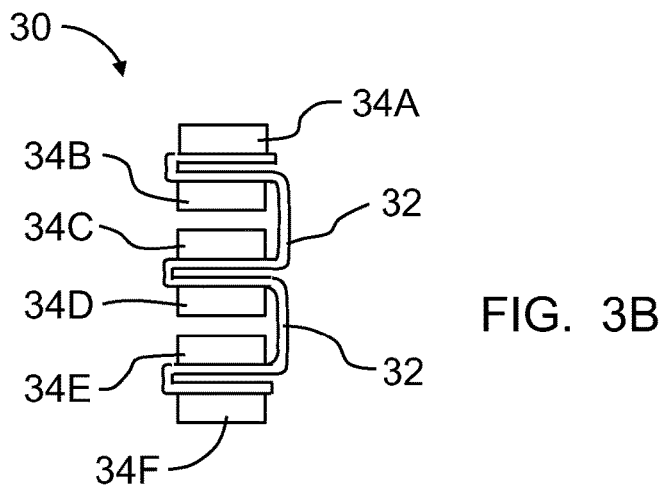
FIG. 3B is a plan view of the fuel sheet in FIG. 3A, formed into a fuel sheet assembly.

FIGS. 3A and 3B show another embodiment, in which pellets 34A through 34F are disposed on a substrate 32 to form fuel sheet 30, and fuel sheet 30 is bent in an accordion or Z-fold fashion to form the fuel sheet assembly shown in FIG. 3B. The pellets 34A through 34F are repositioned such that planar sides of pellets 34B and 34D are adjacent to planar sides of pellets 34C and 34E, respectively, with those adjacent sides in essentially parallel planes. In FIG. 3B the pellets 34A through 34F are arranged in a stack. In variations of this embodiment, the pellets can have other cross-sectional shapes, each layer can have more than one pellet to form more than one stack, and one or more pellets in one layer can be disposed in interstices between pellets between pellets in the adjacent layer.

Figure 4A:
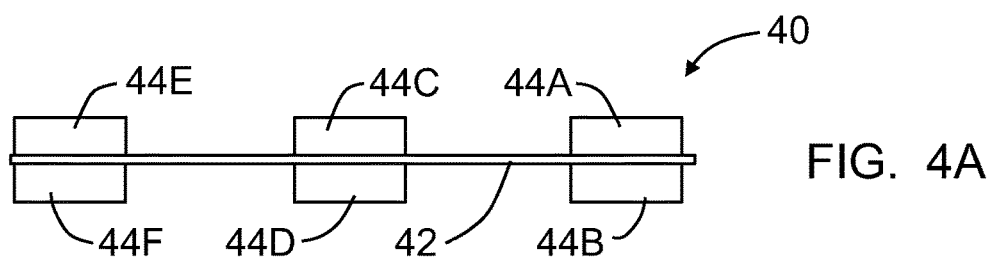
FIG. 4A is a plan view of a third embodiment of a fuel sheet.
Figure 4B:
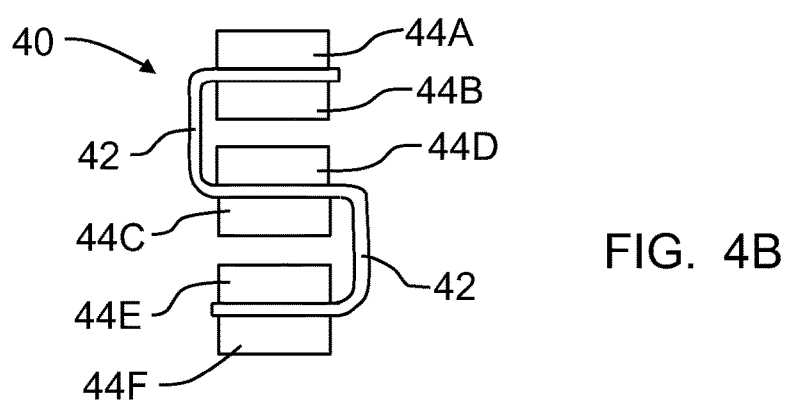
FIG. 4B is a plan view of the fuel sheet in FIG. 4A, formed into a fuel sheet assembly.

A further variation of the embodiment in FIGS. 3A and 3B is shown in FIGS. 4A and 4B. In this embodiment, fuel sheet 40 has pellets 44A, 44C and 44E disposed on one side of substrate 42, and pellets 44B, 44D and 44F disposed on the opposite side of the substrate 42. The pellets on one side of the substrate 42 can be formed directly opposite the pellets on the opposite side of the substrate 42, but other arrangements are possible.

Figure 5A:
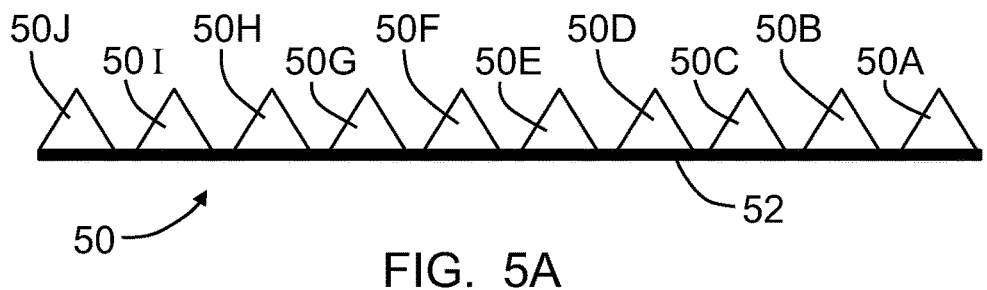
FIG. 5A is a plan view of a third embodiment of a fuel sheet.
Figure 5B:
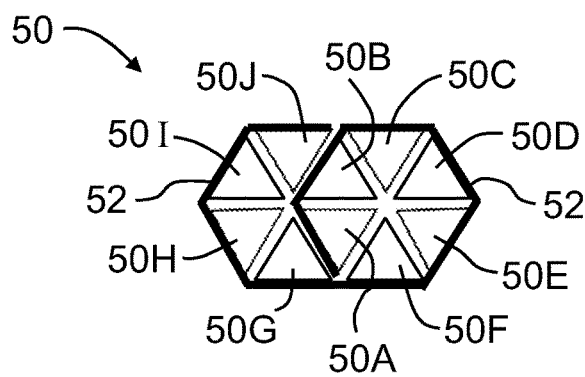
FIG. 5B is a plan view of the fuel sheet in FIG. 5A, formed into a fuel sheet assembly.

Yet another embodiment of a fuel sheet 50 is shown in FIG. 5A, where pellets 50A through 50J are disposed on a substrate 52, and the substrate 52 is bent in a number of places to form the fuel sheet assembly in FIG. 5B.

Figure 6:
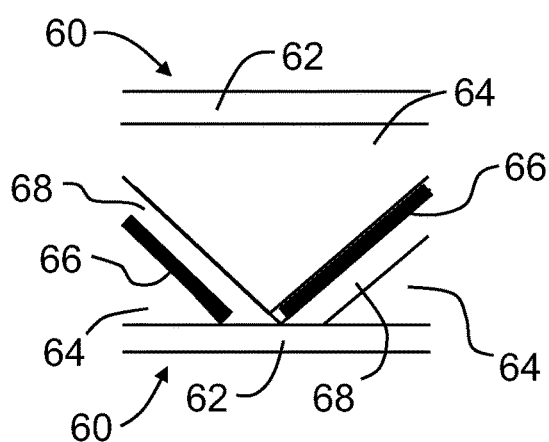
FIG. 6 is a plan view of a section of a first embodiment of a fuel unit.
Figure 7:
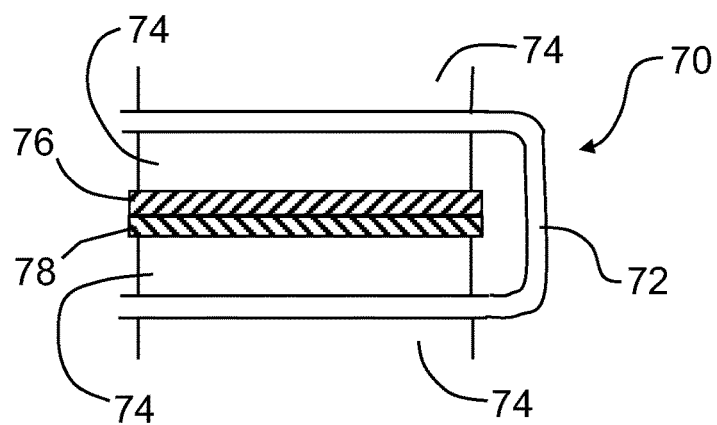
FIG. 7 is a plan view of a section of a second embodiment of a fuel unit.

FIGS. 6 and 7 show partial plan views of embodiments of fuel units including fuel sheet assemblies formed from fuel sheets as described above. In FIG. 6, pellets 64 are disposed on substrate(s) 62, to form one or more fuel sheets 60, with fuel sheet portions facing each other and a pellet 64 on the top fuel sheet portion disposed in the interstice between two pellets 64 on the bottom fuel sheet portion. One or more other fuel unit components 66 and 68 can be disposed in the spaces between adjacent sides of adjacent pellets. For example, component 66 can be a thermal conductor or a heating element. Component 68 can be a layer of thermal insulation. In FIG. 7, pellets 74 are disposed on substrate 72 to form a fuel sheet 70. The fuel sheet 70 is bent to reposition the pellets 74 into a stack. One or more other fuel unit components 76 and 78 can be disposed in spaces between adjacent sides of adjacent pellets 74. For example, component 76 can be a thermal conductor or a heating element. Component 78 can be a layer of thermal insulation. Similar components can be included in fuel units containing any of the embodiments disclosed above, to include but not limited to those in FIGS. 1A and 1B through 5A and 5B.

Figure 8A:
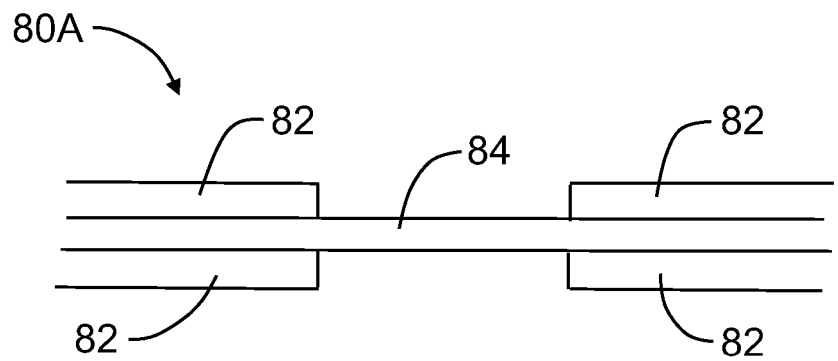
FIG. 8A is a cross-sectional view of a portion of a first embodiment of a package for a fuel unit.
Figure 8B:
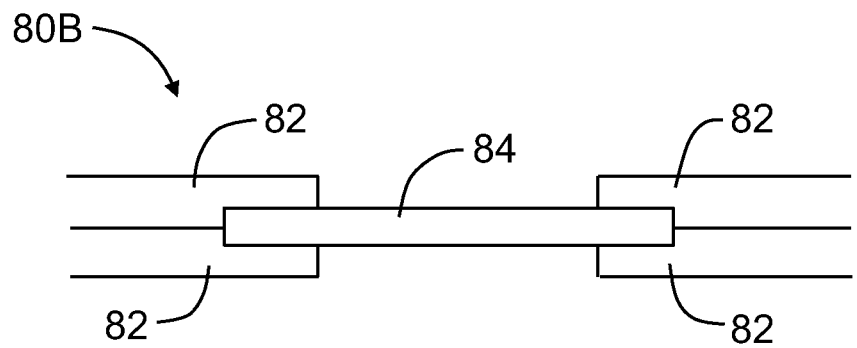
FIG. 8B is a cross-sectional view of a portion of a second embodiment of a package for a fuel unit.
Figure 8C:
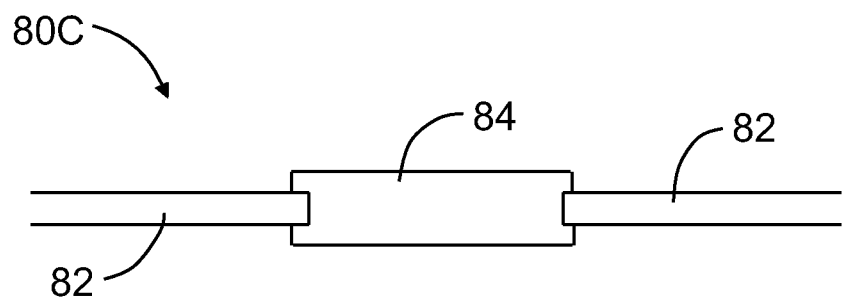
FIG. 8C is a cross-sectional view of a portion of a third embodiment of a package for a fuel unit.

As disclosed above, a fuel unit can have a variety of packages, such as metal, plastic or composite metal and plastic foils, or formed, cast and molded casings. Metal can provide good electrical and thermal conductivity through the package, and plastic can provide electrical and thermal insulation. For example, a composite metal and plastic foil package 80A (see the partial cross section shown in FIG. 8A), has multiple layers 82 and 84. A metal layer 82 can be sandwiched between plastic layers 84. Portions of the plastic layers 84 can be removed to expose portions of the metal layer 82. If the plastic layers 84 are made of poor electrically and thermally conductive materials and the metal layer 82 is made of a material with good electrical and thermal conductivity, exposing the metal layer 82 on both sides of the package 80A can provide good electrical and thermal conductivity through the package 80A where the metal layer 82 is exposed. If it is desired to have multiple areas of good electrical and thermal conductivity through a package 80B (see the partial cross section shown in FIG. 8B), each area of metal layer 82 can be discontinuous, surrounded by plastic layers 84. Similarly, a formed, cast or molded casing can be made of metal (e.g., to provide good electrical and thermal conductivity), plastic (e.g., to provide poor electrical and thermal conductivity) or a composite of metal and plastic (e.g., to provide good electrical and thermal conductivity only through selected areas of the casing). For example, a cross section of a section of a composite casing 80C, as shown in the partial cross section in FIG. 8C. The casing 80C is made of a plastic material 82 with metal inserts 84 in the casing wall. The metal inserts 84 are exposed on both sides of the casing 80C to provide good electrical and thermal conductivity through the metal inserts 84 but not through the surrounding plastic 82.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A method of producing a fuel unit for a hydrogen generator, the method comprising the steps:
    a. providing a substrate in the form of a sheet;
    b. providing a fuel comprising a hydrogen-containing material that releases hydrogen gas when heated;
    c. disposing a plurality of pellets of the fuel on the substrate to form one or more fuel sheets, wherein each pellet has one or more sides, with interstices disposed between adjacent pellets; and
    d. forming a non-cylindrical fuel sheet assembly from the one or more fuel sheets by moving at least one of the first and second fuel sheet portions to position pellets adjacent to each other such that adjacent sides of the adjacent pellets lie in essentially parallel planes; and,
    e. producing a non-cylindrical fuel unit from one or more of the fuel sheet assemblies; and,
        wherein one or more of the pellets are disposed on opposite surfaces of the substrate sheet.

2. The method according to claim 1, wherein moving the first and second fuel sheet portions comprises disposing the first and second fuel sheet portions so pellets on the first fuel sheet portion face pellets on the second sheet portion.

3. The method according to claim 2, wherein at least one pellet on the first fuel sheet portion is positioned in the interstice between two adjacent pellets on the second fuel sheet portion.

4. The method according to claim 1, wherein moving the first and second fuel sheet portions comprises bending the substrate to form an angled or curved segment between two adjacent pellets.

5. The method according to claim 3, wherein prior to assembly, adjacent sides of the adjacent pellets are parallel when the substrate is disposed in a plane.

6. The method according to any one of claim 1, wherein prior to assembly, adjacent sides of the adjacent pellets are not parallel when the substrate is disposed in a plane.

7. The method according to claim 1, wherein the method further includes forming a package around the assembled fuel sheets.

8. The method according to claim 1, wherein the one or more fuel sheets are assembled with thermal insulation disposed between adjacent pellets.

9. The method according to claim 1, wherein the fuel units are man-portable.

10. A method of producing hydrogen gas, the method comprising the steps:
    a. providing a substrate in the form of a sheet;
    b. providing a fuel comprising a hydrogen-containing material that releases hydrogen gas when heated;
    c. forming a fuel sheet by disposing a plurality of pellets of the fuel on the substrate, each pellet having one or more sides, with interstices disposed between adjacent pellets;
    d. forming a non-cylindrical fuel sheet assembly from one or more of the fuel sheets by moving at least one of the first and second fuel sheet portions to position pellets adjacent to each other such that adjacent sides of the adjacent pellets lie in essentially parallel planes;
    e. producing a non-cylindrical fuel unit from one or more of the non-cylindrical fuel sheet assemblies;
    f. disposing the fuel unit in a hydrogen generator; and,
    g. selectively heating pellets to release hydrogen gas from the fuel therein; and,
        wherein one or more of the pellets are disposed on opposite surfaces of the substrate sheet.

11. The method according to claim 10, wherein the heating is done by a plurality of heating elements.

12. The method according to claim 11, wherein each of the plurality of heating elements is disposed in one of the hydrogen generator and the fuel unit, and each heating element is disposed to heat at least one of the pellets.

13. The method according to claim 11, wherein the method further comprises disposing the heater elements between adjacent surfaces of adjacent pellets.

14. The method according to claim 10 wherein the method further comprises disposing thermal conductors between adjacent surfaces of adjacent pellets to conduct heat from the heating elements to the pellets.

15. The method according to any one of steps 10, wherein the method further comprises removing a spent fuel unit from the hydrogen generator and disposing a fresh fuel unit in the hydrogen generator.

16. A fuel unit for a hydrogen generator, the fuel unit made by a method comprising the steps:
  a. providing a substrate in the form of a sheet;
  b. providing a fuel comprising a hydrogen-containing material that releases hydrogen gas when heated;
  c. forming a fuel sheet by disposing a plurality of pellets of the fuel on the substrate, each pellet having one or more sides, with interstices disposed between adjacent pellets;
  d. forming a non-cylindrical fuel sheet assembly from one or more of the fuel sheets by moving first and second fuel sheet portions to position adjacent pellets such that adjacent sides of the adjacent pellets lie in essentially parallel planes; and,
  e. producing a non-cylindrical fuel unit from one or more of the fuel sheet assemblies; and,
    wherein one or more of the pellets are disposed on opposite surfaces of the substrate sheet.

17. The method according to claim 10, wherein at least one pellet is positioned in the interstice between two adjacent pellets.

* * * * *